UNITED STATES PATENT OFFICE.

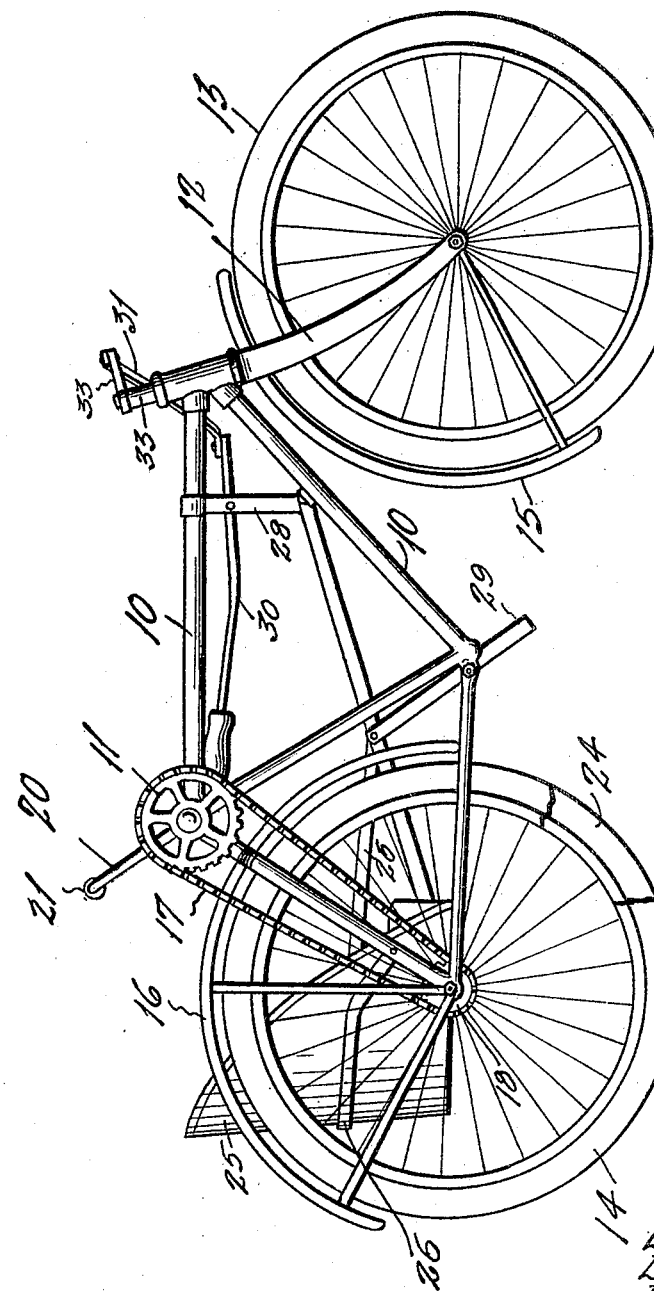

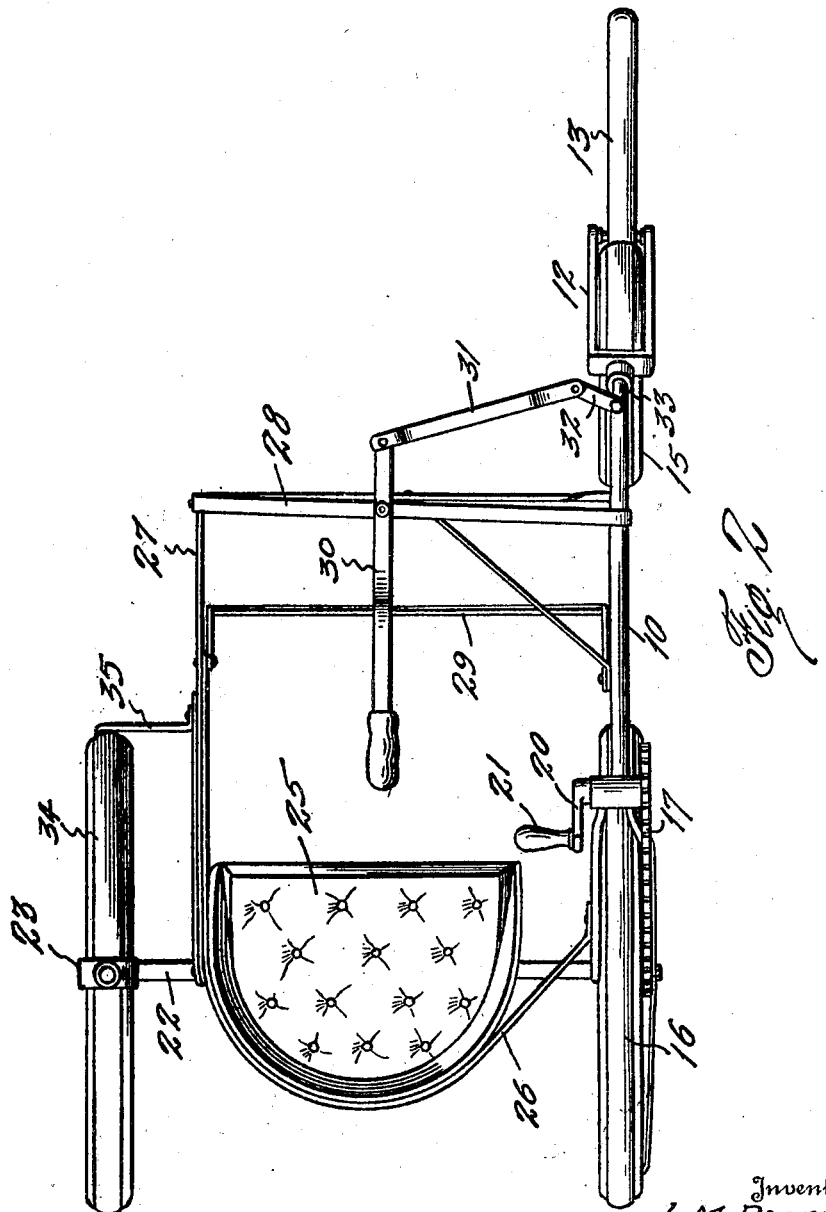

LUTHER M. PAYNE, OF BETHANY, OKLAHOMA, AND LEE A. MILLER, OF GREENVILLE, AND JOHN J. DOUGLAS, OF DALLAS, TEXAS.

CYCLE-CAR.

1,398,493.  Specification of Letters Patent. Patented Nov. 29, 1921.

Application filed June 13, 1921. Serial No. 477,271.

*To all whom it may concern:*

Be it known that we, LUTHER M. PAYNE, LEE A. MILLER, and JOHN J. DOUGLAS, citizens of the United States, residing at Bethany, county of Oklahoma, and State of Oklahoma, Greenville, county of Hunt, and State of Texas, and Dallas, county of Dallas, and State of Texas, have invented certain new and useful Improvements in Cycle-Cars, of which the following is a specification.

This invention relates to new and useful improvements in cycle cars.

The object of the invention is to provide a vehicle especially adapted to be propelled, controlled and steered by means of the hands only, thus being particularly adapted for persons incapable of using their feet.

Another object of the invention is to provide a device in which an ordinary bicycle can be utilized to a large extent in conjunction with a side car frame and wheel. A particular advantage of such an arrangement is that standard bicycle parts may be purchased and utilized and also the convenience and utility of a coaster brake may be had.

A construction designed to carry out the invention will be hereinafter described together with other features of the invention.

The invention will be more readily understood from a reading of the following specification and by reference to the accompanying drawings, in which an example of the invention is shown and wherein:

Figure 1 is a side elevation of a cycle car constructed in accordance with our invention, and Fig. 2 is a plan view of the same.

In the drawings the numeral 10 designates an ordinary bicycle frame which however is inverted so that the sprocket wheel 11 is upper most. The front forks 12 are mounted in the usual way and receive the usual front wheel 13, while the usual rear wheel 14 is mounted in the frame as is a common practice. A mud guard 15 is provided for the front wheel while a mud guard 16 is provided for the rear wheel. The sprocket wheel 11 drives a sprocket chain 17 which is attached to the rear sprocket 18. The sprocket 18 is connected with a suitable coaster brake in the usual manner, said brake not being illustrated. It will be seen that taking an ordinary bicycle, removing the handle bars and seat post and cutting off one of the pedals, the parts just described are available. It is merely necessary to remove the forks 12 from the frame 10, turn the same over and replace the forks. It will be necessary to change the mud guard 16, but otherwise no other changes will be required. The single pedal 20, however, will have to be equipped with a handle 21.

An axle 22 has one end suitably fastened to the rear end of the frame 10, while its opposite end is secured to an upright yoke or fork 23 in which a bicycle wheel 24 of the same diameter as the wheel 14 is suitably mounted. A seat 25 is mounted on the axle 22 and is attached to a brace frame 26 which has one end secured to the bicycle frame 10. The brace frame extends forwardly on the opposite side of the seat and is connected to the front frame member 27 which is bent at right angles and extended across to the frame 10 to which it is attached. A support 28 extends from the frame 10 and has its outer end bent downwardly and attached to the member 27 at the forward end of the latter, whereby said member is supported. A foot supporting loop 29 is fastened to the frame and the members 26 and 27 so that the person occupying the seat 25 may if necessary rest his feet on said loop.

A steering lever 30 is pivoted on the support 28 and forwardly of its pivot point is pivoted to a link 31. The link 31 at its opposite end is pivoted to an arm 32 fastened on the steering post 33 of the bicycle in the same manner as the handle bars are usually attached. The arm 32 is normally directed forwardly so that when the lever 30 is swung to the right by means of its handle, the arm 32 will be swung to the left thus turning the front wheel 13 so as to make a left turn. By swinging the lever 30 to the left the front wheel 13 is turned so as to guide the car to the right. The wheel 24 is provided with a mud guard 34 mounted in the yoke 23 and held by a brace 35 which is connected with the members 26 and 27.

In using the car the passenger occupies the seat 25 and rests his feet on the loop 29. The handle of the lever 30 will be in a convenient position to be grasped by the left hand. With his right hand the passenger may turn the pedal 20 by means of the handle 21 and propel the wheel 14 in the usual way. It will be seen that if the rear wheel is equipped with an ordinary coaster brake, which is not illustrated, the passenger may readily control the operation of the vehicle.

The arrangement whereby an ordinary bicycle is employed makes for a reduction in the expense of building the cycle car, because the standard parts may be purchased in the open market and a practical device may be employed. The controlling of the device is at all times within the power of the passenger and the device may be easily guided and can be turned on a comparatively short radius.

Various changes in the size and construction of the parts as well as modifications, may be made without departing from the spirit of the invention.

What we claim, is:

1. In a cycle car, the combination with a bicycle, of a hand operating device connected with the sprocket wheel of the bicycle, a frame attached to the side of the bicycle frame, a seat mounted on said side frame, a wheel supporting the side frame, and a steering device mounted on the side frame and connected with the front wheel of the bicycle.

2. In a cycle car, an inverted bicycle frame, bicycle wheels supporting said frame, means for propelling said bicycle, a side frame attached to the bicycle, a seat carried by the side frame, a wheel supporting the side frame, a steering lever mounted on the side frame, and connections between the lever and the front fork of the bicycle frame.

3. In a cycle car, a bicycle frame, front and rear wheels supporting the bicycle frame, hand operating means mounted on the bicycle frame for imparting motion to the rear wheel thereof, an axle attached to the bicycle frame, a third wheel supporting the axle, a seat mounted on the axle, and means in front of the seat for steering the front wheel of the bicycle.

4. In a cycle car, a bicycle frame, front and rear wheels supporting the bicycle frame, hand operating means mounted on the bicycle frame for imparting motion to the rear wheel thereof, an axle attached to the bicycle frame, a third wheel supporting the axle, a seat mounted on the axle, means in front of the seat for steering the front wheel of the bicycle, and a foot rest carried in front of the seat.

5. In a cycle car, the combination of an inverted bicycle frame, a front fork mounted in the said frame, a front wheel mounted in the said fork, a rear wheel mounted in the said frame, a hand-operating means mounted on the said frame for imparting motion to the rear wheel, an axle projecting laterally of the rear of the said frame, a third wheel mounted at the end of the said axle, a side frame extending from the said frame and supported by the said axle, a seat mounted on the said axle, a steering lever located in front of the seat and mounted on the said side frame, an arm connected with the front wheel, and a connecting link pivoted at one end to the said steering lever and at the other end to the said arm.

6. In a cycle car, the combination of an inverted bicycle frame, a front fork mounted in the said frame, a front wheel mounted in the said fork, a rear wheel mounted in the said frame, a hand-operating means mounted on the said frame for imparting motion to the rear wheel, an axle projecting laterally of the rear of the said frame, an upright yoke or fork provided at the end of the said axle, a third wheel mounted in the said yoke, a frame member supported at one end by the said axle and extending laterally thereof and bent at right angles to connect with the said frame, a supporting member extending from the said frame to the right angle of the said frame member, a foot rest extending laterally of the said frame and connected with the said frame member, a seat mounted on the said axle, a steering lever located in front of the said seat and mounted on the said supporting member, an arm connected with the front wheel, and a connecting link pivoted at one end to the said steering lever and at the other end to the said arm.

In testimony whereof we affix our signatures.

LUTHER M. PAYNE.
LEE A. MILLER.
JOHN J. DOUGLAS.